May 25, 1943.   E. G. HILL ET AL   2,320,182
CLUTCH CONTROL MECHANISM FOR MOTOR VEHICLES
Filed Dec. 30, 1940   2 Sheets-Sheet 2
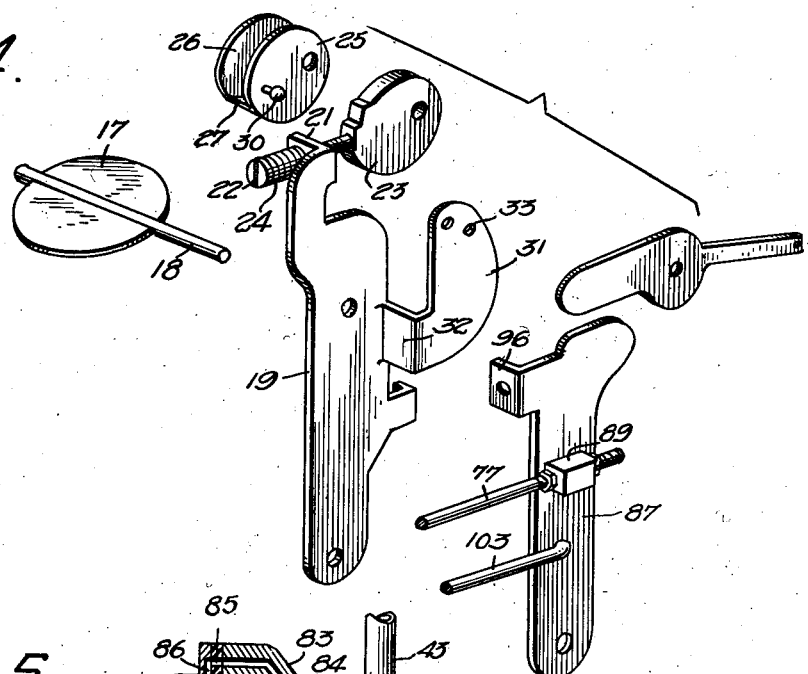
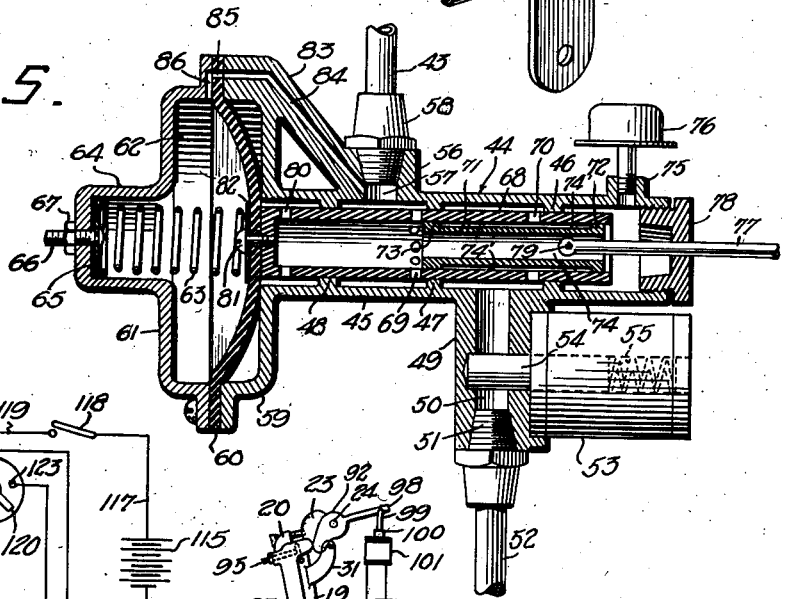
Inventors
EDWARD G. HILL
HENRY W. HEY Patented May 25, 1943

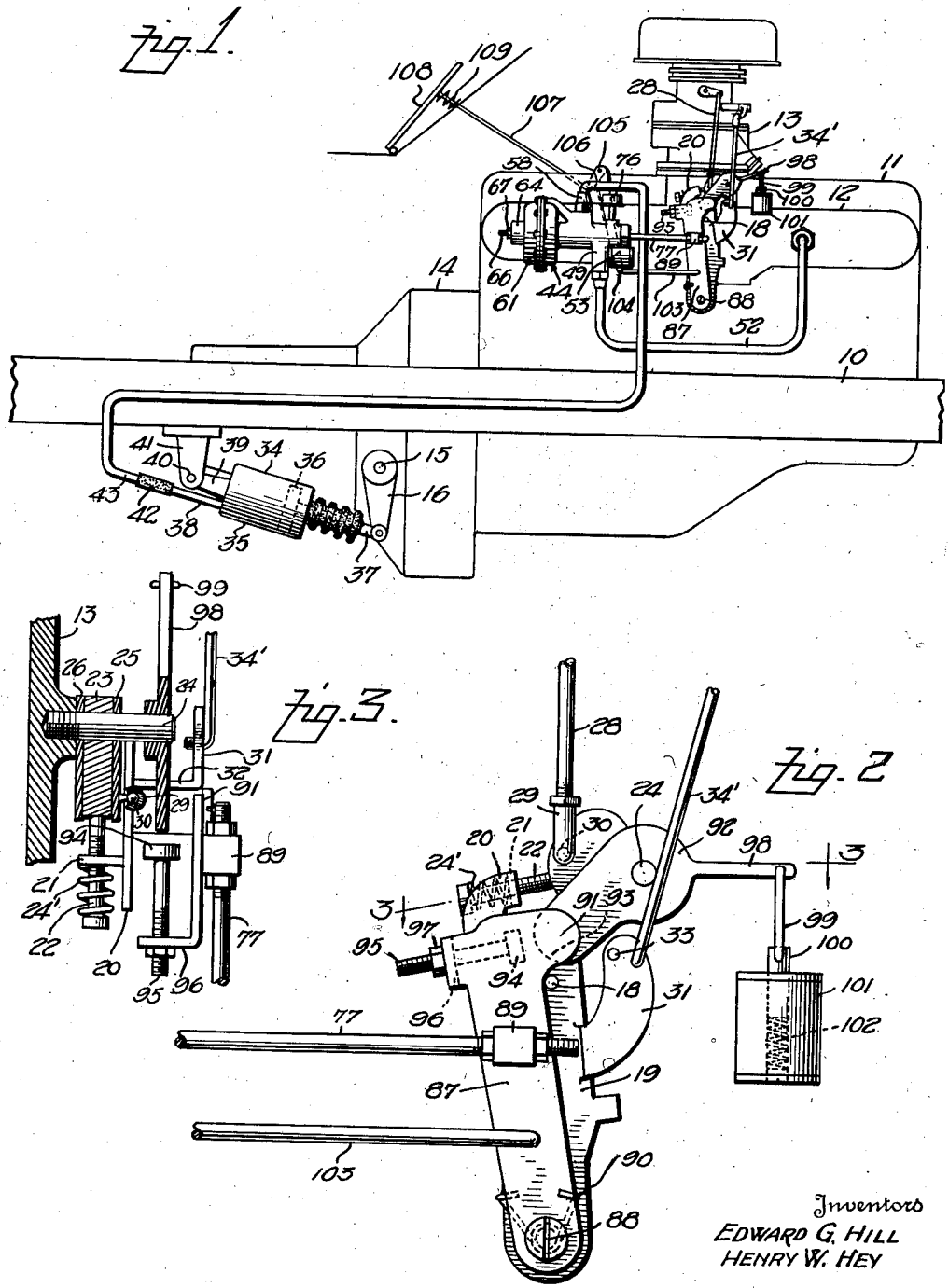

2,320,182

UNITED STATES PATENT OFFICE 2,320,182

CLUTCH CONTROL MECHANISM FOR MOTOR VEHICLES

Edward G. Hill and Henry W. Hey, Richmond, Va., assignors to Hill Engineering Corporation, Richmond, Va., a corporation of Virginia Application December 30, 1940, Serial No. 372,410

23 Claims. (Cl. 192—.01)

This invention relates to clutch control mechanisms for motor vehicles, and is an improvement over the prior patent to Edward G. Hill, No. 1,964,693, granted June 26, 1934, and over the structure of our copending application Serial No. 369,498, filed December 10, 1940.

The prior patent referred to discloses the use of a vacuum motor controlled by a follow-up valve mechanism for disengaging the vehicle clutch and for controlling return movement of the clutch elements into operative engagement. The follow-up control valve mechanism comprises a pair of elements one of which is operated by vehicle accelerator connections and the other of which is pressure responsive to follow up with respect to the first named valve in accordance with pressures in the vacuum motor. Such mechanism is highly efficient in most normal gear shifting operations, the pressure responsive follow-up valve functioning to check the movement of the clutch elements automatically at the point of initial engagement of the clutch elements, as fully set forth in the patent referred to.

In the copending application referred to above, we have disclosed a clutch control mechanism which employs a follow-up valve device similar to that of the patent discussed. Such valve mechanism is employed in connection with control devices operating in such a manner as to provide for earlier engine acceleration with respect to clutch engagement when the motor is cold, and providing for a lagging of the engagement of the clutch elements when the vehicle is being started from a standstill in first or reverse gears, thus preventing stalling of the motor under the conditions referred to.

As is well known when it is desired to shift down from high to second gear, as when starting to ascend a steep grade, it is necessary to speed up the engine motor to a substantial extent prior to clutch engagement, after the shift has been made into second gear, to prevent jerking and lunging of the vehicle which occurs when the clutch elements are brought into engagement while rotating at substantially different speeds. The prior clutch control mechanisms referred to, while extremely smooth and efficient in operation for their intended purposes, do not provide for an efficient shift down from high to second gear.

An important object of the present invention is to provide a clutch control mechanism which functions automatically when a shift is made from high to second gear to effect substantial engine acceleration prior to clutch engagement to thus synchronize the rotation of the two clutch elements to prevent the jerking and lunging of the vehicle.

A further object is to provide a clutch control mechanism wherein the clutch will be disengaged by the vacuum motor whenever the accelerator pedal is released except when the vehicle is in high gear and traveling above a predetermined speed so as to normally permit the use of the vehicle engine as a brake when decelerating, and to provide in conjunction with such mechanism automatic control means operative for effecting the releasing of the clutch when the accelerator pedal is released and the gear shift lever is initially moved to second gear position to declutch and thus permit the shift to be made into second gear from high gear.

A further object is to provide a mechanism of the character referred to wherein, when a shift is being made from high to second gear under the conditions referred to, the depression of the accelerator pedal will cause engine acceleration to take place substantially earlier with respect to clutch engagement than normally would take place, thus providing for engine acceleration before clutch engagement whereby lunging or jerking of the vehicle is prevented.

A further object is to provide a mechanism of the character referred to wherein a control mechanism for the clutch motor functions upon depression of the accelerator pedal when the clutch is disengaged to provide for relatively rapid operation of the follow-up valves to release the clutch elements for movement toward operative engagement followed by more retarded movement of the clutch elements during opening of the engine throttle, and to provide means associated with such mechanism and functioning when a shift is being made from high to second gear to cause opening movement of the throttle and consequently engine acceleration to take place substantially earlier with relation to the initial releasing of the clutch elements and substantially before initial contact of the clutch elements takes place.

Other objects and advantages of the invention will become apparent during the course of the following description.

In the drawings we have shown one embodiment of the invention. In this showing:

Figure 1 is a side elevation of a motor vehicle power plant and associated elements showing the invention applied, Figure 2 is an enlarged fragmentary side elevation of a portion of the lever mechanism of the present invention, Figure 3 is a section taken substantially on line 3—3 of Figure 2, Figure 4 is an enlarged detail perspective view of the elements of the lever mechanism referred to, shown with the elements separated, Figure 5 is an enlarged central vertical sectional view through the follow-up control valve mechanism, and, Figure 6 is a diagrammatic representation of the wiring system associated with the mechanism.

Referring to Figure 1 the numeral 10 designates a motor vehicle frame having the usual engine 11 mounted therein and provided with a conventional intake manifold 12 to which fuel is supplied through a carburetor 13. The engine is provided with the usual clutch 14 having clutch elements (not shown) relatively movable into and out of operative engagement by the rocking of a shaft 15 provided with a crank arm 16.

The carburetor is provided with the usual butterfly throttle valve 17 (Figure 4) mounted on a shaft 18 (Figures 1, 2 and 4) and a lever 19 is rigidly connected to the throttle shaft 18. The upper end of the lever 19 is provided with a projection 20 having a lateral extension 21 in which is mounted a screw 22 the inner end of which engages against a toothed cam 23. A spring 24' surrounds the screw 22 between the head of the screw and the projection 21 to resist turning movement of the screw from any adjusted position. The cam 23 is mounted on a shaft 24 tapped into the riser of the carburetor as shown in Figure 3. The cam 23 is mounted between a pair of plates 25 and 26 connected at the bottom by a web or transverse member 27 which is engageable with the bottom of the cam 23 to swing the latter in a clockwise direction when the vehicle engine is cold. Such turning movement of the plates 25 and 26 is provided for through an arm 28 forming a part of the conventional automatic choke mechanism of the carburetor and provided at its lower end with a socket 29 receiving a ball 30 carried by the plate 25. The cam 23, plates 25 and 26 and the choke rod 28 for operating these plates are all conventional and form no part of the present invention per se, the turning of the cam 23 when the motor is cold serving to limit turning movement of the lever 19 in a clockwise direction when the motor is cold to cause the engine 11 to idle at a higher speed.

The lever 19 is provided with an upstanding extension 31 connected thereto by an integral offset 32. The upper end of the extension 31 is provided with a pair of openings 33 for selective connection with a rod 34' leading to the usual carburetor accelerator pump (not shown). The upper end of the extension 31 serves another purpose to be referred to later.

A differential fluid pressure operated motor 34 is employed for operating the crank 16 to disengage the clutch. The motor comprises a cylinder 35 having a piston 36 therein connected through a piston rod 37 to the crank 16. The right hand end of the cylinder 35 as viewed in Figure 1 is vented to the atmosphere and the other end of the cylinder is provided with a vacuum pipe 38. The same end of the cylinder is provided with a rigid arm 39 pivoted as at 40 to a bracket 41 suitably secured to the frame 10 or any other relatively stationary part of the vehicle. A flexible hose or pipe 42 connects the pipe 38 to one end of a pipe 43 leading to a control valve mechanism indicated as a whole by the numeral 44. The flexible hose 42 obviously permits swinging movement of the cylinder 34 about the pivot 40 to permit the motor 34 to assume various angular positions during swinging movement of the crank 16.

The valve mechanism is shown in detail in Figure 5 and may be identical, except as referred to below, to the valve mechanism shown in our copending application referred to above. The valve mechanism is also similar in its theory of operation to the valve mechanism of the prior patent to Edward G. Hill, also referred to above. The valve mechanism comprises a substantially cylindrical body 45 having a plurality of spaced lands 46, 47 and 48. Between the lands 46 and 47, the valve body is provided with an integral projection 49 having a vacuum passage 50 therethrough and connected by a union 51 to one end of a pipe 52 leading to the intake manifold as shown in Figure 1. The projection 49 carries a solenoid 53 the armature 54 of which acts as a valve to control the passage 50, a light spring 55 normally projecting the valve 54 to closed position as shown in Figure 5. The circuit for controlling this solenoid will be referred to later.

Between the lands 47 and 48, the valve body is provided with a projection 56 having a passage 57 therethrough, and a union 58 connects the projection 56 to the other end of the pipe 43. The left hand end of the valve body 45, as viewed in Figure 5, is provided with a circular extension 59 against one face of which is arranged a diaphragm 60. A circular cap 61 has its peripheral portion secured against the peripheral portion of the diaphragm and to the peripheral portion of the enlargement 59. The space between the cap 61 and diaphragm 60 forms a chamber 62 for a purpose to be described. A light compression spring 63 has one end arranged to urge the diaphragm 60 toward the right as shown in Figure 5, the opposite end of the spring projecting into an axial extension 64 and engaging a spring seat 65 the position of which is adjustable by a screw 66 provided with a lock nut 67.

A sleeve valve 68 is arranged within the valve 45 and slidable within the lands 46, 47 and 48. The valve 68 is provided with a series of radial ports 69 communicating between the interior of the valve 68 and the space between the lands 47 and 48. The ports 69 normally occupy the position shown in Figure 5 and at the extreme left hand position of the valve 68, these ports never pass the land 48 and accordingly are always in communication with the passage 57 and hence with the pipe 43 and motor 34.

The valve 68 is further provided with a series of radial ports 70 which communicate with the space between the lands 46 and 47. The ports 70 normally occupy the position shown in Figure 5 adjacent the land 46, and at the extreme left hand position of the valve 68, the ports 70 are always arranged to the right of the land 47, as viewed in Figure 5, and accordingly are always in communication with the vacuum passage 50.

A spool valve 71 is slidable within the sleeve valve 68 and is provided at opposite ends with heads 72 and 73. This valve, therefore, provides an annular space 74' which is in constant communication with the ports 70 in any position of the valves 68 and 71. The valve head 73 normally occupies the position shown in Figure 5 in which position the ports 69 are in communication with an axial passage 74 extending throughout the length of the valve 71.

The right hand end of the valve body 45 is provided with a radial projection 75 to which is connected a small conventional air cleaner 76. This air cleaner admits air into the right hand end of the valve body and this air has access only to the passage 74 and to the elements which communicate therewith in accordance with the positions of the two valves, as will become apparent. An operating stem 77 is slidable in a cap 78 threaded in the right hand end of the valve body 45 and is connected by a pin 79 to the valve 71. This operating stem, of course, does not interfere with the passage of air through the axial passage 74, and accordingly air is free to flow through the ports 69 whenever the valves are in the position shown in Figure 5. The passage 74, of course, always communicates with the interior of the left hand end of the valve 68, as viewed in Figure 5, and such end of the valve 68 is provided with a port 80 through which air flows into the space between the enlargement 59 and diaphragm 60. The adjacent end of the valve 68 is connected to the diaphragm 60 by a screw 81 extending through a metal washer 82 arranged over the diaphragm 60 and against which the adjacent end of the spring 63 seats.

The valve body 45 is provided with an integral connection 83 provided with a passage 84 therethrough. One end of this passage communicates with the passage 57 while the other end communicates with the chamber 62 through a port 85 cut through the diaphragm 60, and through a groove 86 formed in the adjacent face of the cap member 61. Accordingly it will be obvious that any pressure present in the passage 57 and hence in the motor cylinder 35 (Figure 1) will be duplicated in the chamber 62. As will become apparent, pressures in the chamber 62 are utilized to cause the valve 68 to partake of a follow-up action with respect to the valve 71.

The valve rod 77 is operated by a lever 87 pivotally connected at its lower end as at 88 to the lower end of the lever 19. For this purpose, the rod 77 is connected to the lever 87 by a swivel 89. A light torsion spring 90 tends to turn the lever 87 in a counterclockwise direction about the pivot 88 to maintain the lever 87 in its normal position shown in Figure 2.

The lever 87 is operable by the accelerator pedal of the vehicle in a manner to be described and from its normal position the lever 87 initially turns freely in a clockwise direction about the pivot 88 upon depression of the accelerator pedal to operate the valve 71 (Figure 5) without operating the engine throttle, and after such initial free movement the lever 87 picks up the lever 19 to transmit movement therethrough to turn the shaft 18 and open the engine throttle. The point at which the lever 87 picks up the lever 19 depends on operating conditions to be described. Normally, the lever 87 turns freely about the pivot 88 until the edge of a projection 91 at the upper end of the lever 87 contacts with the adjacent edge of the extension 31. Further depression of the accelerator pedal after this point is reached then transmits movement to the lever 19 to turn it about the axis of the throttle shaft 18.

The present invention is particularly directed to novel means for causing the lever 19 to be picked up by the lever 87 at an earlier point to provide for substantial engine acceleration prior to clutch engagement when a shift is being made from high to second gear. For this purpose, the shaft 24 supports a plate 92 having an integral cam 93 which will be arranged in the position shown in Figure 2 when a shift is being made from high to second gear. The cam 93 is adapted to be engaged by the head 94 of a screw 95 threaded in a lateral extension 96 (Figures 2, 3 and 4) and secured in adjusted positions by a lock nut 97. With the various parts in the position shown in Figure 2, it will be apparent that movement of the lever 87 from its normal position to turn it about the pivot 88 will be stopped when the screw head 94 engages the cam 93, and this result occurs earlier than the stopping of the lever 87 by engagement of the projection 91 with the projection 31, when the cam 93 is in the operative position to be referred to.

The plate 92 is provided with a radially extending arm 98 and a link 99 connects the free end of the arm 98 to the upper end of the armature 100 of the solenoid 101, a suitable spring 102 normally urging the armature 100 upwardly to turn the plate 92 in a counterclockwise direction to swing the cam 93 downwardly to inoperative position.

As previously stated the lever 87 is operable by the accelerator pedal of the vehicle and the accelerator and its connections are generally illustrated, although the particular type of such elements are unimportant, as will be obvious. A rod 103 has one end connected to the lever 87 as shown in Figures 1 and 2, and the other end of this rod is connected to the lower end of one arm 104 of a bell crank lever 105 having its other arm 106 connected by a rod 107 to the accelerator pedal 108. This pedal is shown as having a spring 109 which serves to return the accelerator pedal to idling position when released, this spring also transmitting movement to the rod 107, bell crank lever 105, rod 103 and lever 87, assisted by the light spring 90.

A suitable electric control circuit for the mechanism is shown in Figure 6. The vehicle gear set is generally illustrated by the numeral 110 and is provided at one side with a crank 111 operable by a rod 112 which may be manually or power operated to effect the shifting of the gears. The gear set obviously will be provided with the usual shift rail selecting means, and such means has not been illustrated since it is of no importance per se in connection with the present invention. The gear set is provided with the usual shiftable elements and for the purpose of illustration the gear set has been shown as having its second and high gear shiftable member in the form of a shift rail having one end 113 projecting from one end of the transmission and its other end 114 projecting from the opposite end. The shift rail referred to has been shown in its neutral position. When a shift is made into second gear the rail end 113 moves to the right as viewed in Figure 6 and when the shift is made into high gear, the rail end 114 moves toward the left.

A suitable source of current, such as the vehicle battery, is indicated by the numeral 115 and has one terminal grounded as at 116. The other terminal of the battery is connected by a wire 117 to a main control switch 118 from which a wire 119 leads to a contact arm 120 of a governor switch 121. It will be understood that the governor switch may be controlled by any suitable type of governor and the switch 121 is so designed that when the vehicle speed is below a predetermined speed such as twelve miles per hour, the arm 120 will engage a contact 122. When the vehicle speed is above the predetermined speed referred to, the switch arm 120 will be moved into engagement with a second contact 123.

Between the switch 118 and the governor switch 121, a wire 124 has one end tapped into the wire 119 and has its other end connected to a stationary contact 125. This contact is normally engaged by a switch arm 126 having an insulated strip 127 engageable by the shift rail end 114 when a shift is made into high gear to move the arm 126 into engagement with a contact 128 connected by a wire 129 to the governor switch contact 122. A wire 130 is connected at one end to the switch arm 126 and has its other end connected to the solenoid 53 which controls the vacuum passage 50 of the main control valve mechanism shown in Figure 5. The other terminal of the solenoid 53 is grounded as at 131.

The governor switch contact 123 is connected by a wire 132 to a switch arm 133 having an insulating strip 134 engageable by the shift rail end 113 when a shift is made into second gear to move the switch arm 133 into engagement with a contact 135. This contact is connected by a wire 136 to one terminal of the solenoid 101 which operates the cam plate 92 (Figure 2) and the other terminal of the solenoid 101 is grounded as at 137.

The present invention, while not limited to such use, is particularly intended to be employed with gear shifting mechanisms having a gear shift lever mounted beneath the steering wheel of the vehicle, regardless of whether a power shifting mechanism or a manual mechanism is employed. For the purpose of illustration, a gear shift lever has been illustrated in Figure 6 and designated as a whole by the numeral 138. This lever comprises an inner sleeve element 139 and an outer handle element 140 projecting into the sleeve element and pivoted in the end thereof as at 141 to swing slightly in a plane parallel to the steering wheel. A spring 142 urges the inner end of the handle member 140 upwardly as viewed in Figure 6 and upon upward movement of the handle member 140, the inner end of this member moves downwardly into engagement with a contact 143. A wire 144 connects the contact 143 to the wire 130, while the handle element 140 is shown as being connected by a wire 145 to the wire 124.

As previously stated, the invention is applicable for use with any type of gear shifting mechanism. For the purpose of illustration the lever 138 has been shown as being pivoted as at 146 to a steering column bracket 147, the axis of the pivot 146 being parallel to the plane of the steering wheel to support the lever 138 for movement toward and away from the steering wheel to perform the usual selecting operations. The lever member 139 is pivoted on a pin 148, perpendicular to the pin 146, to swing parallel to the steering wheel to perform the shifting operations. It will be apparent that in shifting out of high gear, the handle member 140 will have its outer end moved upwardly as viewed in Figure 6 and initial movement of the handle member will engage the inner end of this member with the contact 143, whereupon further movement of the handle member 140 will move the member 138 as a whole. The circuit across the contact 143 and the inner end of the handle member is utilized in a manner to be described when shifting down from high to second gear.

The operation of the apparatus is as follows:

Assuming that the vehicle engine has been started and the gear shift is in neutral with the accelerator pedal 108 in idling position, the vehicle clutch will be disengaged. The bell crank lever 105 (Figure 1) will be turned to its limit of movement in a clockwise direction and the rod 103 will have moved the lever 87 to the position shown in Figures 1 and 2, in which case the lever 87 will have moved the rod 77 (Figures 2 and 5) to its left hand limit of movement. Under such conditions, the valves 68 and 71 both will be at their left hand limits as viewed in Figure 5 and the head 73 will be moved to the left at least slightly past the ports 69 to disconnect these ports from the atmospheric passage 74 and connect them to the vacuum space 74', which always communicates through the radial ports 70 with the vacuum passage 50. Under such conditions the left hand end of the cylinder 35 in Figure 1 will be in communication with the intake manifold and the piston 36 will be at the left hand end of the cylinder 35 with the clutch elements disengaged. The reduced pressure in the vacuum motor will be reproduced in the chamber 62 (Figure 5) through passage 84, port 85 and groove 86 and differential pressure affecting the diaphragm 60 will hold this diaphragm against the tension of the spring 63 with the valve 68 in the position previously referred to.

Since the gear set is in neutral, the switch 126 (Figure 6) will be in engagement with the contact 125 and current will be flowing from the battery 115 through wire 117, switch 118, wires 119 and 124, contact 125, switch 126 and wire 130, through the solenoid 53 and thence back to the source through grounds 131 and 116. The solenoid 53 therefore will be energized and the armature 54 (Figure 5) retracted, thus maintaining the passage 50 open to keep the clutch in disengaged position. Under the conditions referred to the operator may lift the handle 140 (Figure 6) toward the steering wheel and thence downwardly and rearwardly parallel to the steering wheel into the low gear position, in accordance with conventional practice.

The operator will now depress the accelerator pedal 108 to release the clutch elements for movement under the control of the valve mechanism in Figure 5, and to open the engine throttle, these two operations engaging the clutch and causing the vehicle to start from a standstill and accelerate. Initial depression of the accelerator from idling position pushes the rod 107 to turn the bell crank lever 105 and thus push to the right (Figures 1 and 2) against the rod 103, thus turning the lever 87 about the pivot 88 in a clockwise direction. This movement takes place wholly independently of the lever 19 until the lever 87 picks up the lever 19 by engagement of the projection 91 with the upper end of the extension 31. Up to such point, the turning of the lever 87 causes the rod 77 to move the valve 71 toward the right as viewed in Figure 5 at a rate approximately twice the rate of movement of the accelerator-operated rod 103 due to the difference in the distances of the connections with the lever 87 of the rods 77 and 103, with relation to the fulcrum pin 88.

Movement of the rod 77 to the right as viewed in Figure 5 causes the valve head 73 to close communication between the ports 69 and vacuum space 74' and open communication between the ports 69 and the atmospheric passage 74. Thus air will be admitted through the ports 69, through the space between the lands 47 and 48, and thence through passage 57 and pipe 43 to the vacuum motor 34. The reduction in the differential pressure affecting the piston 36 thus permits the springs of the vehicle clutch to move the clutch elements toward operative engagement. The admission of air into the clutch operating motor increases the pressure in the vacuum end of the motor and such increase in pressure is duplicated in the chamber 62 (Figure 5) and the spring 63 immediately moves the valve 68 toward the right to an extent depending upon the admission of air into the clutch motor and into the chamber 62 which, in turn, is dependent upon the extent to which the openings 69 are uncovered to the atmosphere and the extent to which the valve 71 continues to move to tend to keep the ports 69 open to the atmosphere.

Thus it will be apparent that admission of air into the clutch motor accompanied by corresponding increases in pressure in the chamber 62 provides for a follow-up action of the valve 68 with respect to the valve 71. The valve 68 is prevented from overrunning the valve 71 in such follow-up action since any tendency for an overrunning of the valves to occur would result in the openings 69 moving over the head 73, thus cutting off the admission of air into the clutch motor and into the chamber 63.

During the range of free movement of the lever 87 with respect to the lever 19, that is, until the projection 91 engages the upper end of the extension 31, the valve 71 will move relatively rapidly with respect to the rate of movement of the accelerator pedal to permit a rapid rate of movement of the clutch elements toward each other. The lever 87 picks up the lever 19 just prior to initial contact of the clutch elements and from such point on, the lever 87 will, in effect, fulcrum about the point of contact of the projection 91 and extension 31, the lever 87 turning about such point while the pivot pin 88 transmits movement to the lower end of the lever 19 to turn the shaft 18 and open the engine throttle. The point of connection of the rod 103 with the lever 87 is approximately twice the distance of the swivel 89 from the point of contact of the projection 91 with the upper end of the extension 31, and after such contact is made, the valve rod 77 moves much more slowly than previously, with relation to the rate of depression of the accelerator pedal to provide relatively slow movement of the clutch elements into actual driving engagement.

Aside from this variable rate of movement of the valve 71 (Figure 5) with relation to the accelerator pedal operation, the main valve mechanism functions to retard movement of the clutch elements when initial contact of these elements takes place, as fully explained in the prior patent to Edward G. Hill and in our co-pending application, both referred to above. Initial contact of the clutch elements retards the rate of movement of the spring pressed clutch element and this retarding is accompanied by an increase in pressure in the clutch motor and a corresponding increase in pressure in the chamber 62 which causes the spring 63 to move the valve 68 to the right as viewed in Figure 5 to cut off the admission of air through the ports 69. The whole mechanism, therefore, functions to provide for very rapid movement of the clutch elements to a point just ahead of engagement of the clutch elements, followed by slower movement of the clutch elements into engagement and a definite checking of the movement upon initial engagement of the clutch elements to provide a soft clutch action.

After the vehicle has been sufficiently accelerated in low gear, the operator will release the accelerator pedal, which action reverses the movements of the elements connected to the accelerator pedal, the lever 19 (Figure 2) turning in a clockwise direction about the axis of the throttle shaft 18 until the screw 22 engages the cam 23 at which point movement of the throttle is stopped in idling position, whereupon further movement of the accelerator pedal will cause the lever 87 to turn in a counterclockwise direction independently of the lever 19 and about the axis of the pin 88 until the lever 87 assumes the normal position shown in Figure 2. During such operation, the valve operating rod 77 will be moved toward the left as viewed in Figures 2 and 5, and the valve head 73 will move across the ports 69 to connect them to the source of partial vacuum referred to, whereupon air will be exhausted from the clutch motor and from the chamber 62. As the valve 71 moves toward the left in Figure 5, therefore, air will be exhausted from the left hand end of the cylinder 35 and the piston 36 will move toward such end of the cylinder 35 to effect clutch disengagement. The exhaustion of air from the diaphragm chamber 62 causes atmospheric pressure on the opposite side of the diaphragm 60 to move the valve 68 toward the left (Figure 5) to follow-up with respect to the valve 71 until this valve reaches its left hand limit of movement, at which time the clutch elements will be completely disengaged.

The operator performs successive shifts in the same manner, it merely being necessary to release the accelerator pedal to disengage the clutch in low, first, second and reverse gears, to make the desired shifts. In each of the shifts referred to the valve mechanism in Figure 5 functions as described above. The shift into high gear is made from second gear in the manner described and when the high gear shift rail end 114 is moved to the high gear position, it moves the switch 126 (Figure 6) away from the contact 125 and into engagement with the contact 128. The circuit previously established through the wire 124 thus will be broken in high gear and releasing of the accelerator pedal will not result in disengagement of the clutch elements unless the vehicle speed is below a predetermined point as determined by the adjustment of the governor switch 121. For example, this switch may be adjusted so that the switch 120 engages the contact 122 at speeds below twelve miles per hour. When the vehicle is in high gear and travelling below twelve miles per hour, therefore, the circuit through the wire 124 will be replaced by a corresponding circuit through the wire 129 and releasing of the accelerator pedal will cause the clutch to be disengaged.

Accordingly it will be apparent that when the vehicle is in high gear and travelling above a predetermined speed, the accelerator pedal may be released to permit the engine to operate as a brake, the clutch elements remaining engaged. Assuming under such conditions that the vehicle is to be brought to a stop, the releasing of the accelerator pedal will cause the vehicle to start to decelerate with the engine acting as a brake, and when the vehicle speed drops to twelve miles per hour or to such other speed as may be desired, engagement of the switch 120 with the contact 122 will close the circuit through the solenoid 53 thus causing the armature 54 (Figure 5) to open the passage 50, thus permitting the valve mechanism to connect the clutch motor 34 to the intake manifold and thus effect declutching. The vehicle may be brought to a standstill by operation of the usual brake.

The present apparatus takes into account the desirability of providing in an automatic clutch control mechanism, a fully automatic means whereby a shift down from high to second gear is wholly practicable. As is well known, a shift down from high to second gear usually is accomplished through what is known as "double clutching" which involves disengaging the clutch, shifting the gears into neutral, releasing the clutch, greatly accelerating the motor speed, and then declutching and shifting into second gear. This is necessary to avoid jerking or lunging of the vehicle incident to the engagement of the clutch elements rotating at greatly different speeds. The present mechanism permits the shift down from high to second gear and upon depression of the accelerator pedal after the shift has been made to second gear, the engine will be greatly accelerated prior to clutch engagement, thus preventing any lunging or jerking action incident to clutch engagement.

Whenever the vehicle is in high gear and travelling above the predetermined speed referred to, such as twelve miles per hour, the switch arm 120 will be in engagement with the contact 123. This contact is connected to the wire 132 but the circuit through this wire will be broken as indicated in Figure 6, between the switch 133 and contact 135, the vehicle being in high gear and the second gear shift rail end 113 being in the position shown. If the driver desires to shift down from high to second gear, he will release the accelerator pedal to place the valve mechanism in condition to connect the clutch motor to the source of partial vacuum, such as the intake manifold 12, whereupon he will start to move the gear shift handle 140. Under the conditions referred to the solenoid 53 will be deenergized since the circuit will be broken at the contact 125 and at the contact 122. However, initial movement of the gear shift handle 140 causes the inner end of this handle to engage the contact 143, thus completing a circuit through wires 124 and 145, and wires 144 and 130 through the solenoid 53 and thence back to the source in the manner stated. The armature 54 (Figure 5), will immediately open the passage 50 and clutch disengagement will occur substantially instantaneously.

The operator, upon the initial movement of the handle 140 referred to, will always instantaneously be enabled to move the shift rail end 114 to neutral position and the shift rail end 113 into second gear position, whereupon he may release the handle 140 and break the circuit at the contact 143, but the circuit through the solenoid 53 will be maintained since the movement into second gear will affect movement of the switch arm 126 into engagement with the contact 125 to restore the normal circuit through the solenoid 53. Accordingly the clutch will remain disengaged. After the shift is completed into second gear, the shift rail end 113 will move the switch 133 into engagement with the contact 135 to complete a circuit from the contact 123 (which is engaged by the switch 120 under the conditions stated) through wire 132, contact 135, wire 136, solenoid 101 and thence back to the source through ground 137. Accordingly, the solenoid 101 will be energized to pull downwardly on the arm 98 (Figure 2) and throw the cam 93 upwardly to operative position. Such operative position is shown in Figure 2 and it will be noted that the gap between the cam 93 and the screwhead 94 is relatively slight.

Having thus made the shift into second gear and placed the cam 93 in operative position, the operator may immediately depress the accelerator pedal and all of the operations previously described as taking place upon depression of the accelerator pedal will be repeated with one important exception. Whereas the lever 87, under normal conditions, will have been permitted to partake of free movement with relation to the lever 19 until just prior to initial clutch engagement, a much shorter free movement of the lever 87 will now be permitted. The gap between the cam 93 and screwhead 94 is very slight, being much smaller than the gap between the projection 91 and the upper end of the extension 31. Under the conditions now being considered the lever 87 will pick up the lever 19 at a much earlier point, the lever 87 transmitting movement to the pin 88 to turn the lever 19 and open the throttle immediately upon contact of the screwhead 94 with the cam 93.

From this point on, relatively rapid opening of the throttle will occur accompanied by relatively slow operation of the valve 71. The movement of the valve 71 due to the lever lengths affecting the rod 77, causes a substantial interval to occur between engagement of the screwhead 94 with the cam 93 and the point at which actual clutch engagement takes place. During this interval substantial opening movement of the throttle will occur and the engine speed will be greatly accelerated prior to clutch engagement, thus automatically providing an operation corresponding to what previously has been accomplished only through "double clutching." The operation, in other words, automatically provides for substantial engine acceleration to approximately synchronize the speed of rotation of the clutch elements before they are brought into engagement thus permitting any appreciable jerking or lunging of the vehicle.

It will be noted that the closing of the circuit through the solenoid 101 not only is dependent upon the placing of the shift rail end 113 in second gear position but also upon engagement of the switch arm 120 with the contact 123. Therefore, the cam 93 can be moved to operative position upon disengagement of the clutch only when the vehicle is travelling at a substantial speed, as when the vehicle is in high gear. During normal shifts the solenoid 101 will not be energized and accordingly substantial engine acceleration at the appreciable interval ahead of clutch engagement will not take place.

From the foregoing it will be apparent that the present construction provides clutch engagement under all of the normal conditions encountered in driving a motor vehicle, that is, during shifts to first, second and high gears and into reverse gear. In addition, the apparatus provides automatic means which permits a shift to be made from high to second gear, for example, when ascending a steep grade, without losing vehicle momentum and without any noticeable jerking or lunging of the vehicle. The present apparatus obviously is capable of use in conjunction with the apparatus of our copending application referred to so that all conditions encountered in clutch engagement may be taken care of automatically.

The invention, of course, is particularly intended for use with transmissions having three or more forward speeds, but it will be obvious that it is not limited in its application to controlling the clutch engaging function when stepping down from high to second gear. The invention can be applied wherever desired for stepping down from any gear ratio to any other gear ratio. In this connection particular attention is invited to the fact that certain motor vehicles are now manufactured having transmissions which are otherwise conventional except that one of the forward gear ratios has been eliminated. Accordingly the present invention not only is applicable to but is intended to be applied to transmissions of such type to properly control the clutch engaging function when stepping down from high gear to the only other lower gear.

The closing of the circuit for the solenoid 53 by slight movement of the handle 140 when the vehicle is in high gear is, of course, of importance in the automatic clutch control mechanism for declutching upon the releasing of the accelerator pedal so that the shift from high to second gear may be made. However, it will be apparent that aside from the importance of the closing of the circuit for the solenoid 53 by the handle 140 for the shift down, it will be apparent that the gear shift lever switch is useful per se in permitting automatic declutching when in high gear and above a predetermined speed, if the operator so desires.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A clutch control mechanism for a motor vehicle including an engine, a transmission, a clutch, a carburetor, and a throttle, comprising a power device connected to the clutch, a control mechanism for said power device, common means for first operating said control mechanism to release the clutch elements for movement toward engagement and later opening said throttle, and means operable under predetermined conditions and when the transmission is in a relatively low gear for causing said common means to open the engine throttle and accelerate the engine speed prior to engagement of the clutch elements.

2. A clutch control mechanism for a motor vehicle including an engine, a transmission, a clutch, a carburetor, and a throttle, comprising a power device connected to the clutch, a control mechanism for said power device, common means for first operating said control mechanism to release the clutch elements for movement toward engagement and later opening said throttle, a vehicle speed controlled mechanism, and means operable when the transmission is in a relatively low gear and said speed controlled mechanism is functioning in accordance with predetermined vehicle speeds for causing said common means to open the engine throttle and accelerate the engine speed prior to engagement of the clutch elements.

3. A clutch control mechanism for a motor vehicle including an engine, a transmission, a clutch, a carburetor, and a throttle, comprising a power device connected to the clutch, a control mechanism for said power device, common means for first operating said control mechanism to release the clutch elements for movement toward engagement and later opening said throttle, a vehicle speed controlled mechanism, a normally inoperative control device operative for causing said common means to open the engine throttle and accelerate the engine speed prior to the engagement of the clutch elements, and means for rendering said control device operative when the transmission is in a relatively low gear and said speed controlled device is functioning in accordance with predetermined vehicle speeds.

4. A clutch control mechanism for a motor vehicle including an engine, a transmission, a clutch, a carburetor, and a throttle, comprising a power device connected to the clutch, a control mechanism for said power device, common means for first operating said control mechanism to release the clutch elements for movement toward engagement and later opening said throttle, a vehicle speed controlled mechanism, a normally inoperative control device including a solenoid energizable to render it operative for causing said common means to open the engine throttle and accelerate the engine speed prior to engagement of the clutch elements, and means for closing a circuit through said solenoid when the transmission is in a relatively low gear and said speed controlled device is functioning in accordance with predetermined vehicle speeds.

5. A clutch control mechanism for a motor vehicle including an engine, a transmission, a clutch, a carburetor, and a throttle, comprising a power device connected to the clutch, a control mechanism for said power device, common means for first operating said control mechanism to release the clutch elements for movement toward engagement and later opening said throttle, a vehicle speed controlled mechanism, a cam normally in an inoperative position and movable to an operative position for causing said common means to open the engine throttle and accelerate the engine speed prior to engagement of the clutch elements, a solenoid energizable for moving said cam to operative position, and a circuit for said solenoid comprising switches in series arranged to be closed when the transmission is in a relatively low gear and said speed controlled device is functioning in accordance with predetermined vehicle speeds.

6. A clutch control mechanism for a motor vehicle including an engine, a transmission, a clutch, a throttle and an accelerator pedal, comprising a pneumatic power device connected to the clutch, a follow-up control valve mechanism for said power device, connections between said accelerator pedal and said throttle and said valve mechanism whereby releasing of the accelerator pedal results in moving the throttle to idling position and disengaging the clutch, and whereby depression of the accelerator pedal results in first reducing the differential pressures in said power device to release the clutch elements for movement toward engagement and later opening the throttle, and means operable under predetermined conditions when the transmission is in a relatively low gear for causing said connections to substantially open the engine throttle prior to reducing differential pressures in said power device sufficiently for clutch engagement to occur.

7. A clutch control mechanism for a motor vehicle including an engine, a transmission, a clutch, a throttle and an accelerator pedal, comprising a pneumatic power device connected to the clutch, a follow-up control valve mechanism for said power device, connections between said accelerator pedal and said throttle and said valve mechanism whereby releasing of the accelerator pedal results in moving the throttle to idling position and disengaging the clutch, and whereby depression of the accelerator pedal results in first reducing the differential pressures in said power device to release the clutch elements for movement toward engagement and later opening the throttle, a vehicle speed controlled mechanism, and means operable when the transmission is in a relatively low gear and said speed controlled mechanism is functioning in accordance with predetermined vehicle speeds for causing said connections to substantially open the engine throttle prior to reducing differential pressures in said power device sufficiently for clutch engagement to occur.

8. A clutch control mechanism for a motor vehicle including an engine, a transmission, a clutch, a throttle and an accelerator pedal, comprising a pneumatic power device connected to the clutch, a follow-up control valve mechanism for said power device, connections between said accelerator pedal and said throttle and said valve mechanism whereby releasing of the accelerator pedal results in moving the throttle to idling position and disengaging the clutch, and whereby depression of the accelerator pedal results in first reducing the differential pressures in said power device to release the clutch elements for movement toward engagement and later opening the throttle, a vehicle speed controlled mechanism, a normally inoperative control device operative for causing said connections to substantially open the engine throttle prior to reducing differential pressures in said power device sufficiently for clutch engagement to occur, and means for rendering said control device operative when the transmission is in a relatively low gear and said speed controlled device is functioning in accordance with predetermined vehicle speeds.

9. A clutch control mechanism for a motor vehicle including an engine, a transmission, a clutch, a throttle and an accelerator pedal, comprising a pneumatic power device connected to the clutch, a follow-up control valve mechanism for said power device, connections between said accelerator pedal and said throttle and said valve mechanism whereby releasing of the accelerator pedal results in moving the throttle to idling position and disengaging the clutch, and whereby depression of the accelerator pedal results in first reducing the differential pressures in said power device to release the clutch elements for movement toward engagement and later opening the throttle, a vehicle speed controlled mechanism, a normally inoperative control device including a solenoid energizable to render it operative for causing said connections to substantially open the engine throttle prior to reducing differential pressures in said power device sufficiently for clutch engagement to occur, and means for closing a circuit through said solenoid when the transmission is in a relatively low gear and said speed controlled device is functioning in accordance with predetermined vehicle speeds.

10. A clutch control mechanism for a motor vehicle including an engine, a transmission, a clutch, a throttle and an accelerator pedal, comprising a pneumatic power device connected to the clutch, a follow-up control valve mechanism for said power device, connections between said accelerator pedal and said throttle and said valve mechanism whereby releasing of the accelerator pedal results in moving the throttle to idling position and disengaging the clutch, and whereby depression of the accelerator pedal results in first reducing the differential pressures in said power device to release the clutch elements for movement toward engagement and later opening the throttle, a vehicle speed controlled mechanism, a cam normally in an inoperative position and movable to an operative position for causing said connections to substantially open the engine throttle prior to reducing differential pressures in said power device sufficiently for clutch engagement to occur, a solenoid energizable for moving said cam to operative position, and a circuit for said solenoid comprising switches in series arranged to be closed when the transmission is in a relatively low gear and said speed controlled device is functioning in accordance with predetermined vehicle speeds.

11. A clutch control mechanism for a motor vehicle including an engine, a transmission, a clutch, a carburetor and an accelerator pedal therefor, comprising a power device connected to the clutch, a control mechanism for said power device operable by the accelerator pedal and constructed and arranged to energize said power device and disengage the clutch upon the releasing of the accelerator pedal, means constructed and arranged for rendering said control mechanism ineffective for energizing said power device when the transmission is in a predetermined gear relation, a transmission shift lever including a handle, and means operative upon initial movement of said handle when the transmission is in said predetermined gear relation for rendering said last named means inoperative.

12. A clutch control mechanism for a motor vehicle including an engine, a transmission, a clutch, a carburetor and an accelerator pedal therefor, comprising a power device connected to the clutch, a control mechanism for said power device operable by the accelerator pedal and constructed and arranged to energize said power device and disengage the clutch upon the releasing of the accelerator pedal, means constructed and arranged for rendering said control mechanism ineffective for energizing said power device when the transmission is in a predetermined gear relation, a transmission shift lever including a handle, electrically operated means for rendering said last named means inoperative, and a circuit for said electrically operated means comprising a switch constructed to be closed upon initial movement of said handle when the transmission is in said predetermined gear relation.

13. A clutch control mechanism for a motor vehicle including an engine, a transmission, a clutch, a carburetor and an accelerator pedal therefor, comprising a differential fluid pressure operated power device connected to the clutch, a source of pressure differential, a control valve mechanism for said power device operable by the accelerator pedal and constructed and arranged to connect said power device to said source to disengage the clutch upon the releasing of the accelerator pedal, an auxiliary valve for controlling communication between said power device and said source, means for closing said auxiliary valve to prevent energization of said power device when the transmission is in a predetermined gear relation, a transmission shift lever including a handle, and means operative upon initial movement of said handle when the transmission is in said predetermined gear relation for holding said auxiliary valve in open position.

14. A clutch control mechanism for a motor vehicle including an engine, a transmission, a clutch, a carburetor and an accelerator pedal therefor, comprising a differential fluid pressure operated power device connected to the clutch, a source of pressure differential, a control valve mechanism for said power device operable by the accelerator pedal and constructed and arranged to connect said power device to said source to disengage the clutch upon the releasing of the accelerator pedal, an auxiliary valve for controlling communication between said power device and said source, means for closing said auxiliary valve to prevent energization of said power device when the transmission is in a predetermined gear relation, a transmission shift lever including a handle, a solenoid energizable for opening said auxiliary valve, and a circuit for said solenoid comprising a switch arranged to be closed upon initial movement of said handle when the transmission is in said predetermined gear relation.

15. A clutch control mechanism for a motor vehicle including an engine, a transmission, a clutch, a carburetor and an accelerator pedal therefor, comprising a power device connected to the clutch, a control mechanism for said power device operable by the accelerator pedal and constructed and arranged to energize said power device and disengage the clutch upon the releasing of the accelerator pedal, means constructed and arranged for rendering said control mechanism ineffective for energizing said power device when the transmission is in a predetermined relatively high gear relation and the vehicle is traveling above a predetermined speed, a transmission lever comprising a pair of elements relatively slightly movable with respect to each other and one of said elements forming a handle, and means for utilizing relative movement between said elements in one direction to make a shift out of said predetermined gear relation, for rendering said last named means inoperative.

16. A clutch control mechanism for a motor vehicle including an engine, a transmission, a clutch, a carburetor and an accelerator pedal therefor, comprising a power device connected to the clutch, a control mechanism for said power device operable by the accelerator pedal and constructed and arranged to energize said power device and disengage the clutch upon the releasing of the accelerator pedal, means constructed and arranged for rendering said control mechanism ineffective for energizing said power device when the transmission is in a predetermined relatively high gear relation and the vehicle is traveling above a predetermined speed, a transmission lever comprising a pair of elements relatively slightly movable with respect to each other and one of said elements forming a handle, electrically operated means for rendering said last named means inoperative, and a circuit for said electrically operated means comprising a switch carried by said shift lever and arranged to be closed upon relative movement of said shift lever elements in one direction to make a shift out of said predetermined gear relation.

17. A clutch control mechanism for a motor vehicle including an engine, a transmission, a clutch, a carburetor and an accelerator pedal therefor, comprising a power device connected to the clutch, a control mechanism for said power device operable by the accelerator pedal and constructed and arranged to energize said power device and disengage the clutch upon the releasing of the accelerator pedal, means constructed and arranged for rendering said control mechanism ineffective for energizing said power device when the transmission is in a predetermined relatively high gear relation and the vehicle is traveling above a predetermined speed, a transmission lever comprising a pair of elements relatively slightly movable with respect to each other and one of said elements forming a handle, means for utilizing relative movement between said elements in one direction to make a shift out of said predetermined gear relation, for rendering said last named means inoperative, and means constructed and arranged to change the operation of said control mechanism when the accelerator pedal is depressed and the transmission is in a predetermined lower gear relation with the vehicle traveling above said predetermined speed.

18. A clutch control mechanism for a motor vehicle including an engine, a transmission, a clutch, a carburetor and an accelerator pedal therefor, comprising a power device connected to the clutch, a control mechanism for said power device operable by the accelerator pedal and constructed and arranged to energize said power device and disengage the clutch upon the releasing of the accelerator pedal, means constructed and arranged for rendering said control mechanism ineffective for energizing said power device when the transmission is in a predetermined relatively high gear relation and the vehicle is traveling above a predetermined speed, a transmission lever comprising a pair of elements relatively slightly movable with respect to each other and one of said elements forming a handle, electrically operated means for rendering said last named means inoperative, a circuit for said electrically operated means comprising a switch carried by said shift lever and arranged to be closed upon relative movement of said shift lever elements in one direction to make a shift out of said predetermined gear relation, and means constructed and arranged to change the operation of said control mechanism when the accelerator pedal is depressed and the transmission is in a predetermined lower gear relation with the vehicle traveling above said predetermined speed.

19. A clutch control mechanism for a motor vehicle including an engine, a transmission, a clutch, and a carburetor having a throttle and an accelerator pedal, comprising a power device connected to the clutch, a control mechanism for said power device, operating connections between said accelerator pedal, said control mechanism and the throttle whereby the releasing of the accelerator pedal results in moving the throttle to idling position and disengaging the clutch and whereby depression of the accelerator pedal results in first reducing the differential pressures in said power device and later opening the throttle, disabling means constructed and arranged for rendering said control mechanism ineffective for energizing said power device when the transmission is in a predetermined relatively high gear relation with the vehicle traveling above a predetermined speed, a transmission shift lever comprising a pair of slightly relatively movable elements one of which forms a handle, and means operative upon relative movement of said lever elements in one direction to make a shift out of said predetermined gear relation, for rendering said disabling means inoperative.

20. A clutch control mechanism for a motor vehicle including an engine, a transmission, a clutch, and a carburetor having a throttle and an accelerator pedal, comprising a power device connected to the clutch, a control mechanism for said power device, operating connections between said accelerator pedal, said control mechanism and the throttle whereby the releasing of the accelerator pedal results in moving the throttle to idling position and disengaging the clutch and whereby depression of the accelerator pedal results in first reducing the differential pressures in said power device and later opening the throttle, disabling means constructed and arranged for rendering said control mechanism ineffective for energizing said power device when the transmission is in a predetermined relatively high gear relation with the vehicle traveling above a predetermined speed, a transmission shift lever comprising a pair of slightly relatively movable elements one of which forms a handle, electrically operated means for rendering said disabling means inoperative, and a circuit for said electrically operated means comprising a switch arranged to be closed upon relative movement of said lever elements to make a shift out of said predetermined gear relation.

21. A clutch control mechanism for a motor vehicle including an engine, a transmission, a clutch, and a carburetor having a throttle and an accelerator pedal, comprising a power device connected to the clutch, a control mechanism for said power device, operating connections between said accelerator pedal, said control mechanism and the throttle whereby the releasing of the accelerator pedal results in moving the throttle to idling position and disengaging the clutch and whereby depression of the accelerator pedal results in first reducing the differential pressures in said power device and later opening the throttle, disabling means constructed and arranged for rendering said control mechanism ineffective for energizing said power device when the transmission is in a predetermined relatively high gear relation with the vehicle traveling above a predetermined speed, a transmission shift lever comprising a pair of slightly relatively movable elements one of which forms a handle, means operative upon relative movement of said lever elements in one direction to make a shift out of said predetermined gear relation, for rendering said disabling means inoperative, and means operative when a shift is completed into a relatively lower gear relation and the vehicle is traveling above said predetermined speed for causing said connections to open the engine throttle at a substantially earlier time with relation to the engagement of the clutch elements.

22. A clutch control mechanism for a motor vehicle including an engine, a transmission, a clutch, and a carburetor having a throttle and an accelerator pedal, comprising a power device connected to the clutch, a control mechanism for said power device, operating connections between said accelerator pedal, said control mechanism and the throttle whereby the releasing of the accelerator pedal results in moving the throttle to idling position and disengaging the clutch and whereby depression of the accelerator pedal results in first reducing the differential pressures in said power device and later opening the throttle, disabling means constructed and arranged for rendering said control mechanism ineffective for energizing said power device when the transmission is in a predetermined relatively high gear relation with the vehicle traveling above a predetermined speed, a transmission shift lever comprising a pair of slightly relatively movable elements one of which forms a handle, electrically operated means for rendering said disabling means inoperative, a circuit for said electrically operated means comprising a switch arranged to be closed upon relative movement of said lever elements to make a shift out of said predetermined gear relation, and means operative when a shift is completed into a relatively lower gear relation and the vehicle is traveling above said predetermined speed for causing said connections to open the engine throttle at a substantially earlier time with relation to the engagement of the clutch elements.

23. A clutch control mechanism for a motor vehicle including an engine, a transmission, a clutch, a carburetor and a throttle, comprising a power device connected to the clutch, a control mechanism for said power device, actuating means operable for normally providing opening movement of the throttle and deenergization of said power device to provide for releasing of the clutch elements for movement toward operative engagement in timed relationship to opening movement of the throttle, and means operable under a plurality of predetermined conditions, one of which is when the transmission is in a relatively low gear, for resulting in relative lagging movement of the clutch elements toward operative engagement with relation to opening movement of the throttle.

EDWARD G. HILL.
HENRY W. HEY.